W. C. CARR.
MOTOR TRUCK.
APPLICATION FILED JAN. 3, 1916.
1,248,075.
Patented Nov. 27, 1917.
7 SHEETS—SHEET 2.
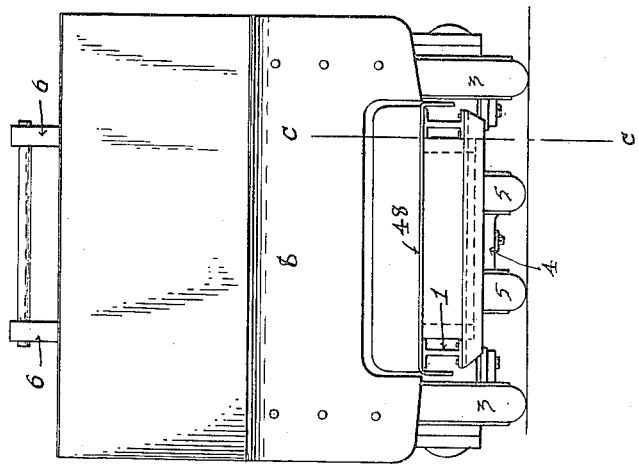
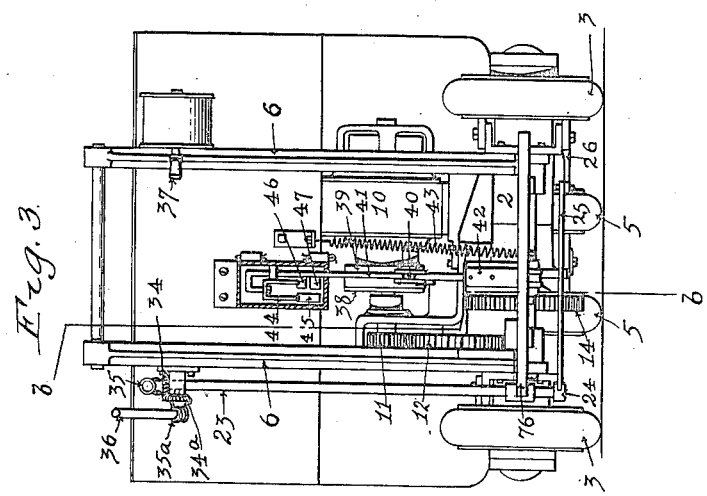
Inventor
William C. Carr
by A. J. Sangster
Attorney

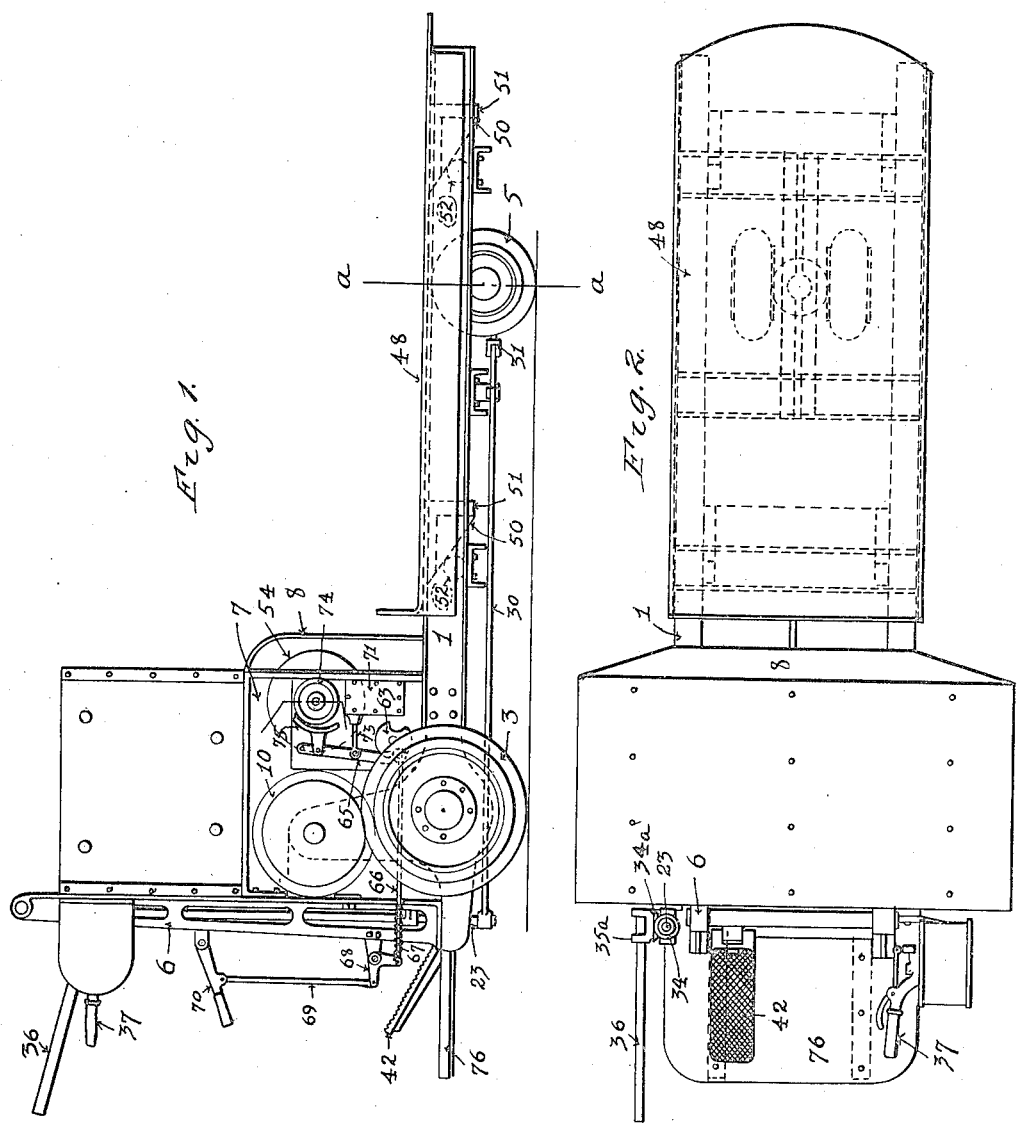

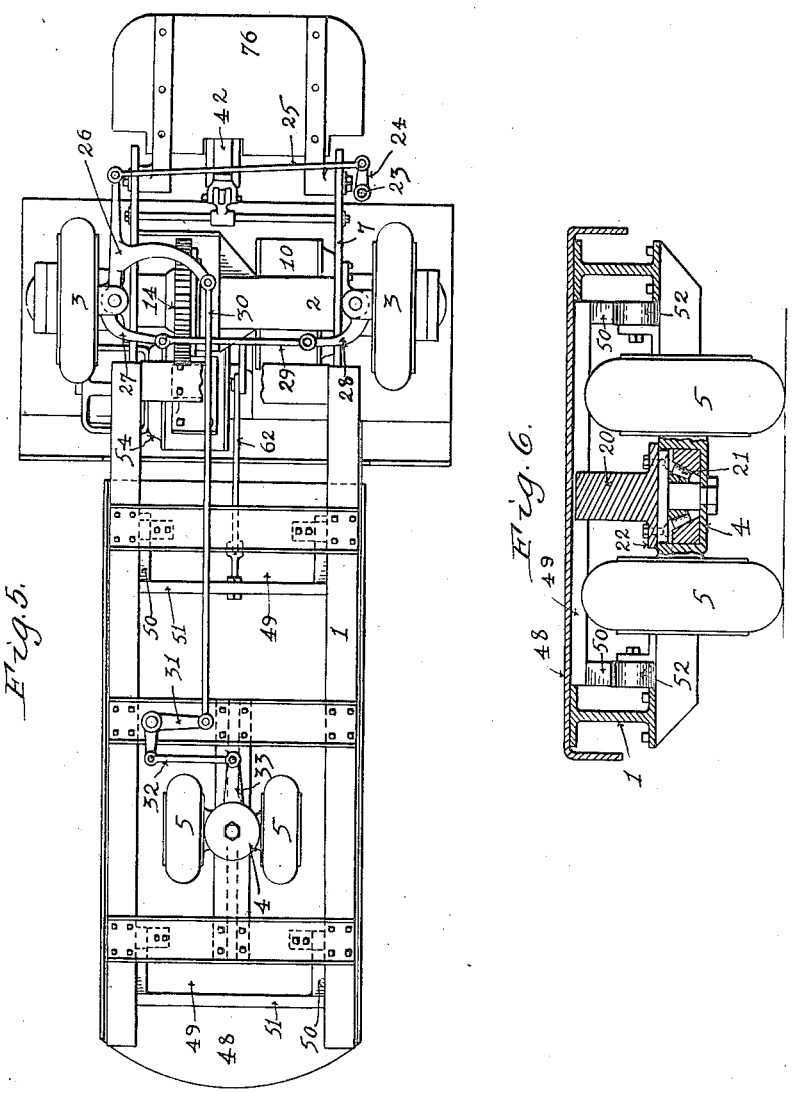

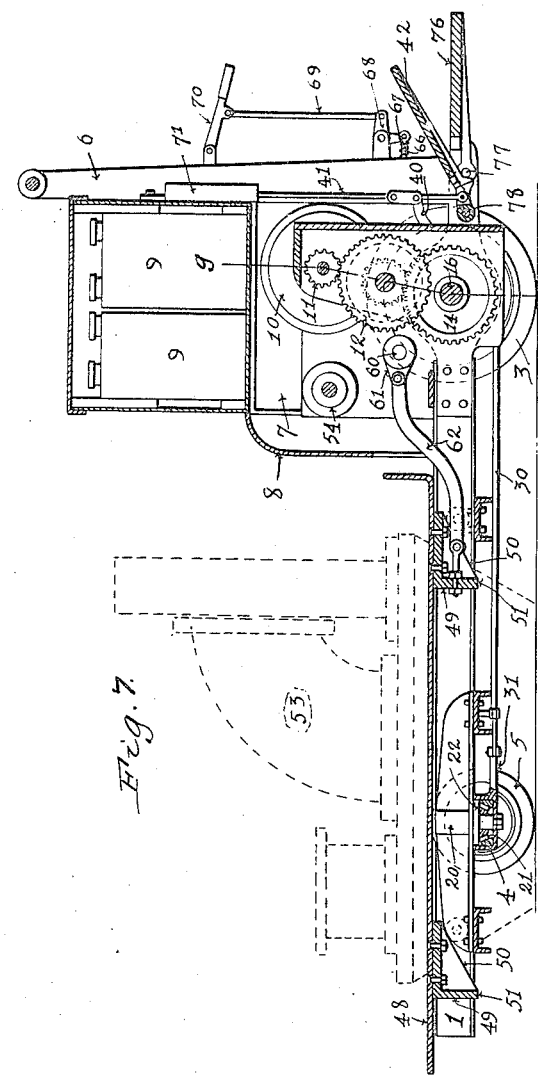

W. C. CARR.
MOTOR TRUCK.
APPLICATION FILED JAN. 3, 1916.
1,248,075.
Patented Nov. 27, 1917.
7 SHEETS—SHEET 5.
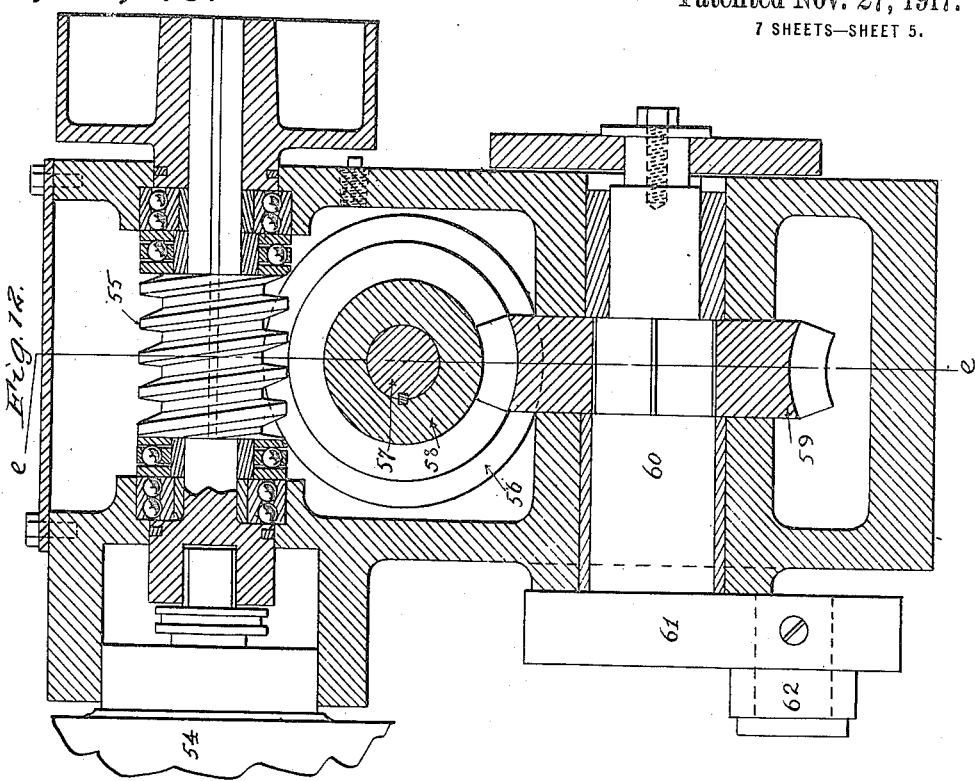
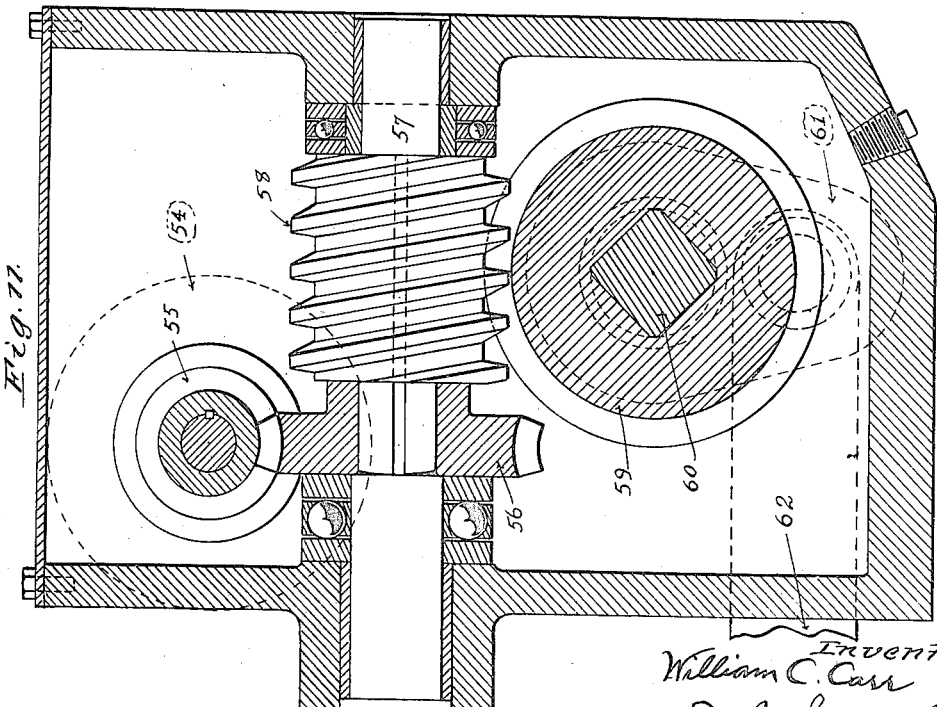
Inventor
William C. Carr
by A. J. Sangster
Attorney W. C. CARR.
MOTOR TRUCK.
APPLICATION FILED JAN. 3, 1916.
1,248,075.
Patented Nov. 27, 1917.
7 SHEETS—SHEET 6.
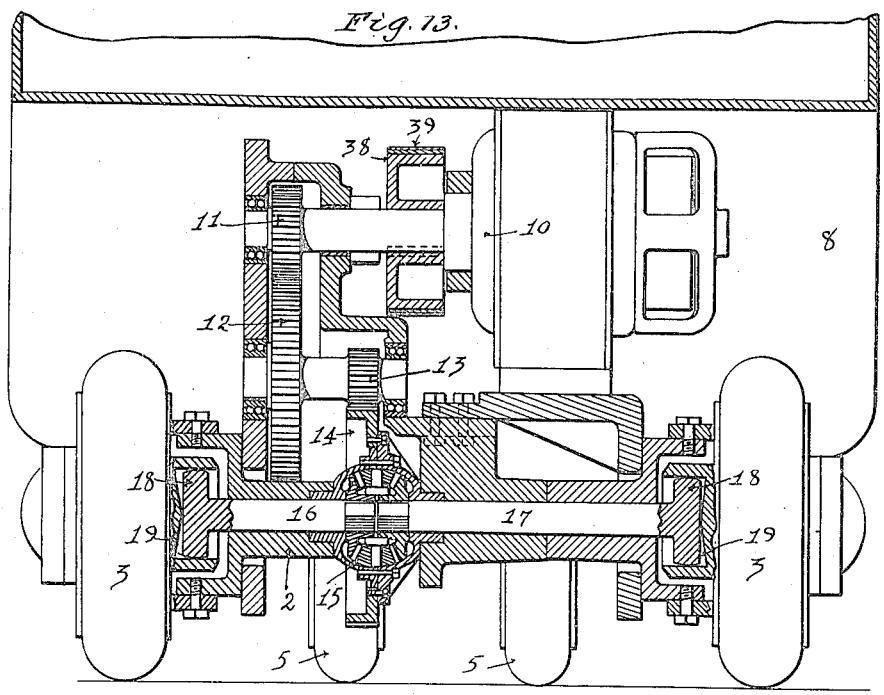
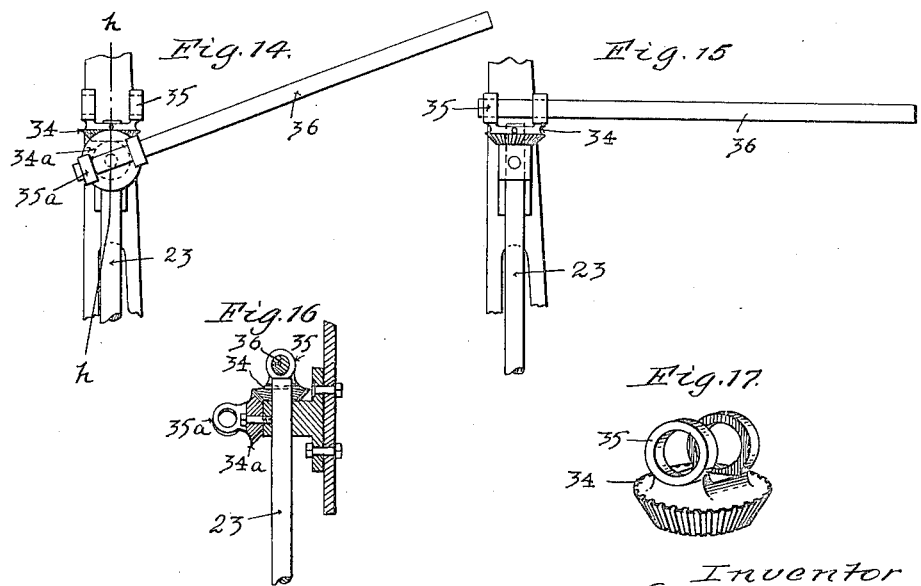
Inventor
William C. Carr
by A. J. Sangster
Attorney W. C. CARR.
MOTOR TRUCK.
APPLICATION FILED JAN. 3, 1916.
1,248,075.
Patented Nov. 27, 1917.
7 SHEETS—SHEET 7.
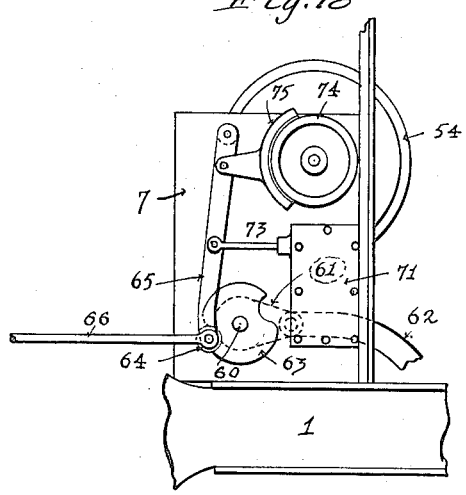
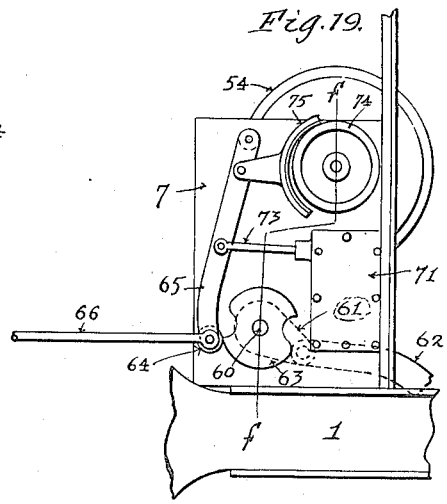
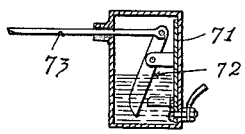
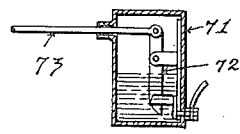
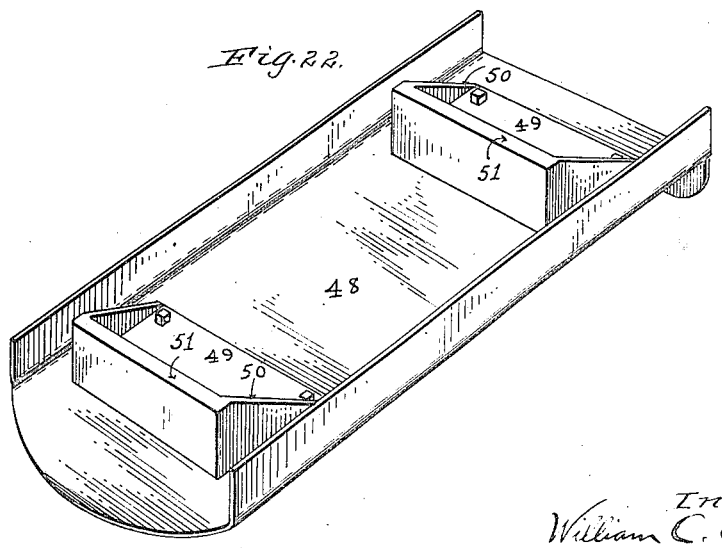
Inventor
William C. Carr
by A. J. Sangster
Attorney

UNITED STATES PATENT OFFICE.

WILLIAM C. CARR, OF BUFFALO, NEW YORK, ASSIGNOR TO THE AUTOMATIC TRANSPORTATION COMPANY, OF BUFFALO, NEW YORK.

MOTOR-TRUCK.

1,248,075.   Specification of Letters Patent.   Patented Nov. 27, 1917.

Application filed January 3, 1916. Serial No. 69,978.

*To all whom it may concern:*

Be it known that I, WILLIAM C. CARR, a citizen of the United States, residing at Buffalo, in the county of Erie and State of New York, have invented a certain new and useful Improvement in Motor-Trucks, of which the following is a specification.

My invention relates to trucks and more particularly to power-propelled trucks of the type and character shown in my pending application, Serial Number 761,451 filed Apr. 16, 1913, in which the motive power consists of a battery and electric motor and mechanism. Still further this invention relates to power-driven trucks provided with a power-actuated lifting platform.

While the several specific improvements of this invention will appear from the drawings herewith and from the following specification and claims, I will indicate as the principal, broad features,—first, the power-actuated lifting platform and the means for actuating and controlling the same; second, the combined circuit and brake control of the propelling mechanism; third, improved means of steering; fourth, the novel arrangement of parts to adapt the truck to rough handling, to lifting and carrying very heavy loads in close quarters; fifth, an effective reduction gearing whereby a heavy load may be raised and lowered on a platform by a small motor and without reverse movement of the motor.

Referring to the drawings herewith,—

Figure 1 is a side elevation.
Fig. 2 is a plan view.
Fig. 3 is a rear end elevation.
Fig. 4 is a front end elevation.
Fig. 5 is an under side plan view.
Fig. 6 is a section on *a—a*, Fig. 1.
Fig. 7 is a section on *b—b*, Fig. 3.
Fig. 8 is a section on *c—c*, Fig. 4.
Fig. 9 is a section on *d—d*, Fig. 10.
Fig. 10 is a section on the same line as Fig. 7, showing the folding platform and treadle.
Fig. 11 is an enlarged detail section on *e—e*, Fig. 12.
Fig. 12 is an enlarged detail section on *f—f*, Fig. 19.
Fig. 13 is an enlarged detail section on *g—g*, Fig. 7.
Fig. 14 is a detail side elevation of the steering head with the steering lever inserted to swing in vertical plane.
Fig. 15 is a similar view with the steering lever inserted to swing in horizontal plane.
Fig. 16 is a detail section on *h—h*, Fig. 14.
Fig. 17 is a perspective of one of the steering-head castings.
Fig. 18 is a detail of the platform lifting motor, switch and brake control showing the brake set and the switch open.
Fig. 19 is a detail identical with Fig. 18, but with the brake released and the switch closed.
Fig. 20 is a detail section of the switch, open in position corresponding to Fig. 18.
Fig. 21 is a detail section of said switch, closed in position corresponding to Fig. 19.
Fig. 22 is an underside perspective of the lifting platform.

I will first describe the general structure of the truck. A truss frame 1, constructed preferably of I-beams and channel irons, carries the axle 2 of the driving wheels 3 and also the pivoted axle 4 of the wheels 5. As will hereafter appear, both pairs of wheels are steered simultaneously from a common steering source. Mounted vertically on the frame 1 are heavy pillars 6 which, in connection with the side plates 7 which are rigidly secured to said pillars and to said frame, carry the motors and their mechanisms. A metal covering 8 secured to the side plates 7 covers in the mechanism front and top and forms the floor for the battery 9. The battery 9 is housed on all sides by metal plates.

The wheels 3 are driven by the mechanism clearly shown in Fig. 13, which consists of a motor 10 taking current from the battery 9, a spur-gear 11 in mesh with a gear 12 having on its shaft a spur-gear 13 in mesh with a rim-gear 14 on the differential 15. The shafts of all of these gears are preferably mounted in antifriction bearings, as shown in said figure. The two driving-shafts 16 and 17 in the axle 2 are square-shanked into the secondaries of the differential 15, and on their outer ends are T-shaped, as shown at 18 in Fig. 13, and these ends take into slots 19 in the hub members of the steering knuckles of the wheels 3, said slots being constructed to constitute with said T-ends of said shafts, universal joints to permit steering of the wheels.

Referring now especially to Figs. 5 and 6, it will be seen that the wheels 5, 5, carry the large part of the great load for which this truck is designed. The axle 4 is pivoted to a king-post 20, and between this post and axle is an antifriction bearing 21; and to preserve alinement of this bearing and to prevent undue and uneven strain upon it, the king-post 20 has an extension or flange 22 which extends over the axle 4, normally out of frictional contact with it but sufficiently close to bear on said axle to prevent side strain on said bearing. When it is understood that such a truck is designed to lift and carry weights of one or more tons, the necessity and importance of this bearing and other features of strength and power herein described will be recognized.

The steering mechanism is clearly shown in Figs. 3, 5, and 14 to 17, inclusive. Starting from the steering post 23 (the steering head being hereafter described), this post 23 has rigidly mounted upon its lower end a lever 24, to which is pivoted a rod 25, which in turn is pivoted to one arm of a bell-crank lever 26 rigidly secured to the hub member of one of the steering knuckles of the wheels 3. The hub members of the two steering knuckles are connected by levers 27 and 28 and a rod 29 pivoted to their free ends. The other arm of the bell-crank lever 26 has pivoted to it the rod 30, the other end of which rod is pivoted to a bell-crank lever 31 which is pivoted to a truss of the frame 1. To the other end of the bell-crank lever 31 is pivoted a rod 32, which in turn is pivoted to a lever arm 33 rigidly secured to the axle 4 of the wheels 5.

By this improvement, rotation of the steering post 23 affects all four wheels, turning the two pairs in opposite directions whichever way said steering post is turned; and thus the truck may be turned about, if need be, practically within its own length. And in the use of trucks of this type, especially in factories, machine shops, and the like, this capability of double steering is of great importance. And while I am aware that steering all four wheels is not novel, I believe the particular combination herein shown to be new and know it to be highly useful.

Referring now especially to the steering head shown in Figs. 2, 3, and 14 to 17, inclusive, in the operation of a truck of this type, often in close quarters, often up against a wall or other object, it becomes necessary to provide means for the accomplishment of the function performed by the means I will now describe. Mounted upon the upper end of the steering post 23 and also upon a pivot on the bearing for the upper end of said steering post are two identical bevel-gear castings 34 and 34$^a$. These gears are in mesh and have eyes 35 and 35$^a$, respectively, to receive a steering lever or rod 36. If the operator inserts the steering lever 36 in the eyes 35 of the gear 34, the truck may be steered by moving said rod in horizontal plane. If inserted in the eyes 35$^a$ of the gear 34$^a$, the steering may be effected by moving said rod in vertical plane.

Current is applied to the propelling motor by a lever which operates an electric switch of the rheostat and reversing type described and claimed in my pending application Serial Number 834,370 filed Apr. 25, 1914. Reference is made thereto for a detailed description of the same.

It is also necessary that the operator be able to cut off current and apply a brake at the same time to stop the truck practically instantly. He must be able to move and stop it after very small movement in order to pick up a load or to place a load exactly in a desired position. For this purpose the following means are employed: Mounted upon the shaft of the motor 10 is a brake-drum 38 which is engaged by a brake-band 39, shown in Figs. 3, 10 and 13. A brake band clamping lever 40, of the usual type, actuates the brake-band 39, and this lever is actuated by a vertical rod 41. The lower end of this rod 41 is pivoted to a treadle 42 and said rod 41 is held raised in the release position by a spring 43. The upper end of the rod 41 is connected with an electric switch (see Fig. 3) which has a movable contact 44, one arm of which is in continuous electrical connection with a plate 45 which is connected to one end of the break in the circuit, and the other arm of said contact 44 makes electrical connection with a plate 46, connected with the other end of the break in said circuit, when the rod 41 is in the raised position, and which is moved onto an insulated plate 47 when said rod 41 is forced down by the operator depressing the treadle 42.

Thus, assuming power to have been applied through the rheostat lever 37 and the truck to be moving, by depressing the treadle 42 the operator applies the brake and opens the power circuit at the same time, thus stopping the truck without movement of the rheostat lever 37. And if it is desired again to apply power to move the truck, perhaps only a few inches to bring it in position for taking up or placing a load, release of the treadle 42 frees the brake and closes the power circuit permitting such small movement, which may immediately be stopped as above described. This improvement gives the operator a perfectness and minuteness of control which could not be attained by an electric switch and a brake independently operated.

I will now describe the lifting platform and the mechanism for operating the same. The lifting or raising platform, designated generally by the reference-character 48 is of strong metal plate with depending side flanges which overhang the longitudinal I-beams of the frame 1, as clearly shown in Figs. 6 and 22. Bolted to the under side of this platform 48 are raising blocks 49 which have inclined bearing edges 50 and which edges terminate at their lower ends in flat, horizontal bearing surfaces 51. Pivoted to the cross trusses of the frame 1 are rollers 52, so positioned that the edges 50 of the raising blocks 49 travel on them. When the lifting or raising platform 48 is down, as shown in Fig. 1, or Figs. 6 and 7, it rests upon the longitudinal I-beams of the frame 1. When it is drawn rearwardly by the mechanism hereafter described, the inclined edges 50 of the raising blocks 49 travel up on the rollers 52, thus raising the platform until, at the completion of the raising movement, the flat, horizontal surfaces 51 rest upon the rollers 52, as shown in Fig. 8, so that there is no tendency of the platform to slide down upon the inclined edges 50.

Thus, if it is desired to load a heavy casting, such as is shown in broken outline at 53 in Figs. 7 and 8, which rests upon skids or other supports so that the truck may be run underneath it, the truck is moved under the casting with the raising platform down in the position of Fig. 7. The raising platform 48 is then raised (by the mechanism presently described) to the position shown in Fig. 8, when it may be carried by the truck to any desired place.

I will now describe the mechanism for raising and lowering the platform 48. And it is specially to be noted here that so great a load must be lifted and lowered to place very slowly and carefully, and also that it requires large reduction in leverage between the motor and the rod moving said platform 48 up and down said inclines 50. A motor 54 takes its current from the battery 9, which also supplies current to the motor 10. Referring now especially to Figs. 7, 8, 11, 12, the motor 54 is coupled to the shaft of a worm 55, which is in mesh with a worm-gear 56 which is rigid upon a common shaft 57 to which is keyed a worm 58, which is in mesh with a worm-gear 59. This worm gear 59 is rigid upon a shaft 60 which carries upon one end a crank 61, and to this crank 61 is pivoted a connecting rod 62, the other end of which is pivoted to the rear raising block 49. The shaft of the worm 55 and the shaft 57 have antifriction bearings, as shown in Figs. 11 and 12, and the shaft 60 is mounted in wide bearings of anti-friction metal, the ends of which bearings fit snug against the worm-gear 59 to hold it rigid against axial movement under the heavy strain put upon it. This reduction gearing reduces the speed between the motor and the shaft 60, in the truck from which these drawings are made, from 440 to 1.

Next I will describe the electric switch and brake mechanism for controlling the movements of the mechanism just described. Mounted upon the other end of the shaft 60 is a cam 63, which is diametrically recessed to receive and seat a follower 64 on a lever 65, as clearly shown in Figs. 18 and 19. These recesses are positioned so as to seat said follower when the crank 61 is in either extreme position,—that is, when the platform 48 is in either the clear down or the clear up position, the crank 61 is on dead center. The lever 65 is pivoted at its upper end to a fixed part of the machine, and has upon the pivot of the follower 64 a rod 66 which is normally drawn inwardly toward said cam 63 by a spring 67. To the outer end of the rod 66 is pivoted one arm of a bell-crank lever 68 which is pivoted to a lug on the standard 6, and the other arm of said bell-crank lever 68 is pivoted to a rod 69, which in turn is pivoted to a hand-lever 70, which also is pivoted to a lug on the standard 6. The parts just described are clearly shown in Figs. 1 and 7, and referring now especially to Figs. 18 to 21, inclusive, I will describe the electric switch and motor brake mechanism. Within an oil-containing casing 71 is mounted an ordinary electric knife-switch 72 which is capable of opening and closing the circuit of the motor 54 by means of a rod 73 pivoted to said knife-edge switch and to said lever 65. When the follower 64 is seated in the cam 63, as shown in Fig. 18, the switch 72 is open, as shown in Fig. 20. When the cam 63 is in the position shown in Fig. 19, with the follower 64 riding upon its surface, the electric switch is closed, as shown in Fig. 21.

The shaft of the motor 54 has a brake-drum 74, and pivoted to said arm 65 is a friction brake 75 capable of acting upon said drum 74.

Assuming now that the platform 48 is in the lowered position of Fig. 7 and it is desired to raise the same to the position shown in Fig. 8, the operator lifts the hand-lever 70, which through the connections above described, draws the rod 66 out against the spring 67 and thus draws the follower 64 out of the cam 63, and also, through the lever 65, closes the electric switch 72 and releases the brake 75. The motor 54, through the worm and gear mechanism above described, rotates the crank 61, and through the connecting-rod 62 draws the lifting platform 48 rearwardly up on the rollers 52. This elevates the platform; and it will also be noted that, as soon as this movement is started so that the follower 64 contacts with the circular surface of the cam 63, the operator may let go of the handle 70 and the brake 75 will remain off and the switch 72 remain closed until the cam 63 has made a half-revolution and the follower 64, drawn in by the spring 67, seats itself in the diametrically opposite recess in said cam 63. When this occurs, the platform 48 will have been completely raised and the horizontal faces 51 on the blocks 49 will rest upon the rollers 52, and with such movement completed, the follower 64 will drop into its seat in the cam 63 and the switch 72 will be opened and the brake 75 applied, thus stopping the motor.

To return the platform 48 to the lowered position, the above operation is, in substance, repeated, the crank 61 completing its revolution and the motor being stopped by the same cam action. In this manner it is not necessary to reverse the motor, and the electric switch being submerged in oil, arcing is prevented.

The platform upon which the operator stands is shown at 76, and by reference to Fig. 10, I will now show the construction by means of which this platform 76 and the treadle 42 may be turned or folded up when occasion requires. The platform 76 is pivoted at 77 to an extension on the frame 1 so that it may be turned up to the position shown in broken outline in Fig. 10, and the treadle 42 being pivoted to said extension of the frame 1 at 78, it also may be swung up inside of the platform 76 to the position shown in broken outline in said figure. This improvement is of special advantage in using the truck in close quarters where in turning, or loading, or depositing a load in a desired place might otherwise be impossible.

Having thus described my invention, I claim:—

1. In a truck of the type described, the combination with a truck body and a motor carried thereby, of an elevating platform adapted to be raised and lowered by longitudinal movement on said body, inclines and antifriction rollers interposed between said body and said platform, reduction gearing for said motor, a shaft driven thereby, a crank on said shaft and a connecting-rod pivoted thereto and to said platform, a cam on said shaft having two oppositely-positioned recesses for seating a follower, a follower, an electric switch and a brake for said motor and connections between said follower and said switch and brake whereby said switch is opened and said brake applied when said follower seats in either of said recesses in said cam, and manual means for unseating said follower, whereby said brake is released and said switch closed to cause movement of said platform in either direction without reversal of direction of rotation of said motor.

2. In a truck of the type described, the combination with a truck body, of an elevating platform and a motor carried by said body, means interposed between said body and said platform for raising and lowering said platform by movement of the same longitudinally on said body, means for moving said platform longitudinally and holding the same in either extreme position comprising gearing driven by said motor, a crank actuated by said gearing and a connecting rod pivotally connected to said crank and to said platform, an electric switch and a brake for said motor, a cam in common rotation with said crank having seats oppositely disposed to receive a follower when said crank is in either extreme position, a follower engaging said cam and connections between said follower and said switch and brake, whereby power is cut off and the brake applied whenever said crank reaches either extreme position.

3. In a truck of the type described, in combination with a frame, a motor and reduction gearing, a platform carried over said frame and adapted to be raised and lowered by longitudinal reciprocating movement thereover, a shaft driven by said gearing, a crank on said shaft and a connecting-rod pivotally connecting said platform therewith, inclined-planes interposed between said platform and said frame, a cam on said shaft having seats positioned to receive a follower when said crank is in either extreme position, a follower, an electric switch for said motor and connections between said follower and said switch and means for holding said follower against said cam, whereby said switch is automatically opened when said crank reaches either extreme position.

4. In a truck of the type described, the elements and combinations of claim 2 above, and manually-operated means for unseating said cam and closing said switch.

WILLIAM C. CARR.

Witnesses:
JON H. PRESCOTT,
L. J. GOODSELL.